United States Patent [19]
Baumgart et al.

[11] Patent Number: 5,963,569
[45] Date of Patent: Oct. 5, 1999

[54] MULTIPLE CHANNEL ACOUSTO-OPTIC MODULATORS

[75] Inventors: Peter Michael Baumgart, San Jose; James Hammond Brannon, Palo Alto; Chie Ching Poon, San Jose; Andrew Ching Tam, Saratoga, all of Calif.

[73] Assignee: International Business Machines Corporation, Armonk, N.Y.

[21] Appl. No.: 08/825,305

[22] Filed: Mar. 28, 1997

[51] Int. Cl.⁶ .................................. G02F 1/33; H01S 3/10
[52] U.S. Cl. ............................ 372/28; 359/312; 359/314; 372/26
[58] Field of Search .......................... 359/305, 310–314; 372/9, 13, 26, 28; 385/4, 7

[56] References Cited

U.S. PATENT DOCUMENTS

| | | | |
|---|---|---|---|
| 3,609,009 | 9/1971 | Lohman et al. | 359/310 |
| 3,958,863 | 5/1976 | Isaacs et al. | 359/305 |
| 3,989,778 | 11/1976 | Osborne | 264/25 |
| 4,224,096 | 9/1980 | Osborne | 156/380 |
| 4,321,564 | 3/1982 | Tregay | 332/7.51 |
| 4,371,964 | 2/1983 | Podmaniczky et al. | 372/38 |
| 4,470,661 | 9/1984 | Matsumoto | 350/96.13 |
| 4,549,789 | 10/1985 | Horiuchi et al. | 359/311 |
| 4,638,266 | 1/1987 | Aüch et al. | 359/311 X |
| 4,705,362 | 11/1987 | Ryan et al. | 359/311 X |
| 4,912,487 | 3/1990 | Porter et al. | 346/108 |
| 5,062,021 | 10/1991 | Ranjan et al. | 360/135 |
| 5,077,748 | 12/1991 | Kozlovsky et al. | 372/22 |
| 5,108,781 | 4/1992 | Ranjan et al. | 427/53.1 |
| 5,138,482 | 8/1992 | Hatori et al. | 359/305 |
| 5,482,497 | 1/1996 | Gonnella et al. | 451/57 |
| 5,508,119 | 4/1996 | Sheu et al. | 428/687 |
| 5,526,109 | 6/1996 | Johnson | 356/28.5 |

FOREIGN PATENT DOCUMENTS

| | | | |
|---|---|---|---|
| 0652554 A1 | 5/1995 | European Pat. Off. | G11B 5/84 |
| 60-107617 | 6/1985 | Japan | G02F 1/11 |
| 1-216316 | 2/1988 | Japan | G02F 1/11 |
| 4-83388 | 7/1990 | Japan | H01S 3/117 |
| 7-65359 | 8/1993 | Japan | G11B 5/84 |
| 08194197 | 7/1996 | Japan | G02F 1/11 |

OTHER PUBLICATIONS

Anonymous, "Texturing A Magnetic Tape Surface", Research Disclosure, Feb. 1987, No. 274, pp. 27470.
J. Lekavich, "Basics of Acousto–Optic Devices", Lasers & Applications, Apr. 1986, pp. 59–64.

Primary Examiner—John D. Lee
Attorney, Agent, or Firm—G. Marlin Knight

[57] ABSTRACT

A multichannel acousto-optic modulator (MCAOM) is described which uses a crystal with a plurality of mounting faces for acoustic transducers. The mounting faces are oriented so that the acoustic transducers mounted thereon generate acoustic fields which intersect the incident laser beam at a common angle, i.e., the Bragg angle. A two channel MCAOM uses two transducers. Extension to any higher number of channels follows accordingly. Energizing any of the transducers causes a corresponding first order beam to be diffracted out. Since the acoustic field for each transducer intersects the incident beam with a unique orientation, each first order beam is diffracted out on a unique axis. A system utilizing an MCAOM has electronic means for controlling the driving signals to the transducers to control each channel as required by the application. Amplitude and frequency modulation of the driving signals allows the intensity and angle of the beams to be controlled.

26 Claims, 9 Drawing Sheets

MULTIPLE CHANNEL ACOUSTO-OPTIC MODULATORS

RELATED APPLICATION

This application is related to commonly assigned and concurrently filed application entitled "Laser System for Simultaneous Texturing of Two Sides of a Disk" Ser. No. 08/825,307.

FIELD OF THE INVENTION

The invention relates to the field of optics and more particularly to acousto-optic modulators and systems for their use.

BACKGROUND

Acousto-optic modulators (AOMs) are often used to split and/or modulate a laser beam. The basic principle of AOMs is that a transparent medium subject to a stress undergoes a change in the index of refraction. When the stress is high frequency sound waves, such as might be produced by a piezoelectric transducer, the change in refraction is periodic. The periodic refraction pattern can act as a diffraction grating producing what is called Bragg diffraction. The undiffracted beam is called the zeroth order beam and the primary diffracted beam is called the first order beam.

Amplitude modulation of laser beams is another requirement for many applications. The amount of light diffracted in an AOM is a function of the acoustic power being applied and can, therefore, be modulated by varying the applied power. Generation of a second modulated beam from one original incident beam using prior art techniques requires a second AOM in series with the first. The second modulated beam created this way may vary significantly from the first modulated beam in intensity or size and may contain an admixture of the modulation characteristics of the first modulated beam.

Many laser applications require the use of beam splitters to derive two equal intensity beams from an original beam. Conventional spatial beam splitting techniques such as partial reflective/transmissive lens coatings can produce two continuous beams of at most approximately 50% intensity. Another disadvantage with conventional beam splitters is that they are not available for all wavelengths. Mechanical splitting or chopping techniques such as rotating polygon mirrors have all of the disadvantages associated with moving parts such as speed variations and limitations.

SUMMARY OF THE INVENTION

The invention is a multichannel acousto-optic modulator (MCAOM) and a laser system utilizing the MCAOM. The MCAOM is a general purpose optical component which has a wide range of applications. The simplest use provides the function of multiple prior art AOMs in a single crystal with the resultant advantages of lower cost and simpler designs. More powerful embodiments flow from the fact that an MCAOM can produce multiple modulated beams with intensity in each beam which is near to that of the incident beam. The multiple modulated beams thus created can have high equivalence between the beams. A dual or two channel AOM (DCAOM) solves the prior art problem of tandem AOMs inducing an admixture of beams by generating two modulated and spatially separate beams from a single incident beam.

The multiple beams created by an MCAOM can be independently controlled by electronic means and need not be correlated with one another. The total energy in the diffracted beams existing at any one time must sum to less than the energy of the incident beam, but within this limitation the multiple beams can be switched, modulated and swept independently.

An MCAOM uses a crystal with a plurality of mounting faces for acoustic transducers. A DCAOM crystal has two faces on which the acoustic transducers are mounted to generate acoustic fields which intersect the incident beam at a common angle, i.e., the Bragg angle. A three channel MCAOM uses three crystal faces and so forth. Extension to any higher number of channels follows accordingly.

The mounting faces of an MCAOM crystal are oriented so that energizing any of the transducers causes a corresponding first order beam to be diffracted out. Since the acoustic field for each transducer intersects the incident beam with a unique orientation, each first order beam is diffracted out on a unique axis.

A system utilizing an MCAOM has electronic means for controlling the driving signals to the transducers to control each channel as required by the application. Amplitude and frequency modulation of the driving signals allows the intensity and angle of the beams to be controlled.

DETAILED DESCRIPTION OF THE INVENTION

Since conventional AOMs are typically designed to operate with essentially single wavelength light, the material for the crystals are selected based on the wavelength. Materials are known which are suitable for use over the wavelength span from 0.2 to over 20 microns. Selection of the material for the MCAOMs of the invention is made according to these known principles. This implies that MCAOMs may be constructed for any wavelength for which crystals can be found for AOMs. The number of channels for which an MCAOM can be designed is limited only by the requirements of the geometry of the acoustic fields in the crystal as will be shown. The invention will first be described in a dual channel embodiment.

Figure 1:
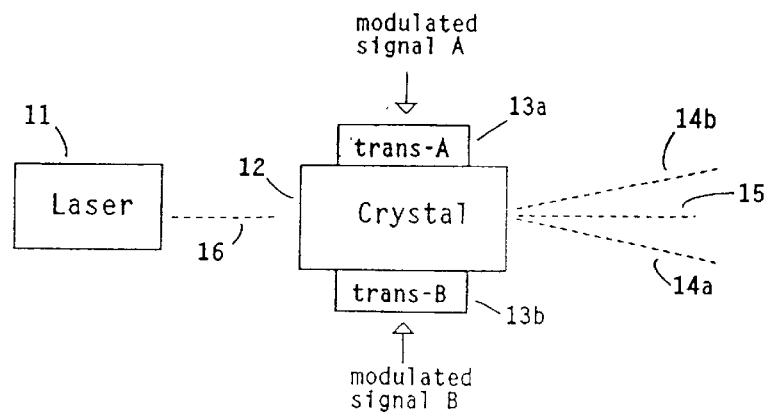
FIG. 1 is a block diagram of a system using a two channel AOM according to the invention.

FIG. 1 illustrates a block diagram of a DCAOM according to the invention. Laser 11 produces a beam 16 which is directed to crystal 12. The laser may be of any type, pulsed or continuous. The wavelength of the light must be one at which the crystal is transparent. Crystal 12 has transducers 13a, 13b mounted on opposing faces for producing acoustic waves from electrical signals. The transducers are typically piezoelectric devices which are attached to the crystal by adhesive or mechanical means. Each transducer is controlled by it own modulation signal designated as A and B. Both amplitude and frequency modulation of electrical signals driving the transducers are possible using standard techniques. A single zeroth order beam 15 emerges from the crystal. When neither transducer is activated the zeroth order beam 15 is the same as the incident beam. Activating transducer 13a causes a portion of the incident beam to be diffracted into beam 14a which is a first order beam which will be called the A1-beam. Likewise activating transducer 13b causes a portion of the incident beam to be diffracted into the B1-beam 14b which is also a first order beam. The zeroth order beam or residual beam will always exist at some level of amplitude even when the typical maximum diffraction of 80–90% is achieved.

Although it is possible and desirable for some applications to operate a MCAOM with more than one transducer being driven at a time, the energy in the resulting beams will necessarily be reduced from the maximum possible from the incident beam, since diffracted beams are fractional portions of the incident beam. If only one transducer is allowed to be activated at a time, the diffracted beam can be driven to its maximum level. When operated in this mode an MCAOM can produce a set of pulsed first order beams which are maximally similar and have 80–90% of the intensity of the incident beam and are thus superior for some applications to a set of beams produced by prior art techniques. Note also that the beam size for each first order beam can be made essentially identical, since the path for each beam is extremely similar. It should also be noted that although prior art AOMs have two output beams, i.e., a zeroth order beam and 1st order beam, which have similar paths and beam sizes, they are not well matched in amplitude due to fact that 100% diffraction is not possible.

In a prior art tandem AOM arrangement to produce two similar beams there are two possible configurations. It is possible to take the first order beam from AOM-1 as beam A, then direct the zeroth beam to AOM-2 to generate the second first order beam as beam B. Beams A and B clearly have very different paths and are therefore, subject to differences in amplitude and beam size making it difficult to achieve highly similar beams using this arrangement. It is also possible to use zeroth and first order beams from AOM-2 as beams A and B by routing the AOM-1 first order beam to AOM-2. In this configuration the problem of different paths does not occur, since both beams have passed through AOM-1 and AOM-2. However, the longer path length through two AOMs rather than one inherently leads to increased beam size due to diffraction which may affect the pulse risetime. Also since it is not possible to diffract 100% of the beam, the zeroth beam from AOM-2 inherently contains the undiffracted portion of the input beam which can be on the order of 10–20%. This leakage makes it impossible to bring the zeroth beam to zero amplitude when there is an input beam to AOM-2. A DCAOM solves this problem by generating two modulated and spatially separate beams from a single incident beam as will be seen.

Figure 2:
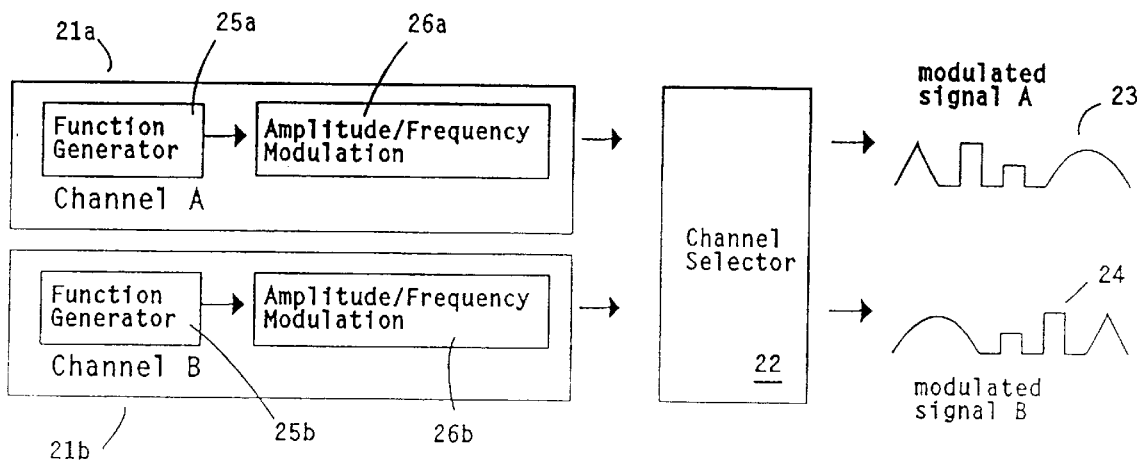
FIG. 2 illustrates the control functions for a two channel AOM according to the invention.

FIG. 2 illustrates the electronic control functions for an embodiment of a two channel AOM, in which the transducers are driven independently, which includes the ability to drive them alternately. The arbitrary modulated signals A and B are generated by separate channels A and B 21a, 21b comprising a function generators 25a, 25b and means to modulate the amplitude and/or the frequency of the signals 26a, 26b. The function generator could be a standard RF signal generator. The amplitudes and frequency of the modulated signals A and B need not be equal and use of separate modulation control means for each channel allows the amplitudes and frequencies to be set independently. This feature allows a maximum flexibility for a wide range of applications. Channel selector 22 in this embodiment is used to select (enable) A and/or B or to disable both. The channel selector is not required to allocate equal time slices to each channel. For example, Channel A could be selected indefinitely without activating Channel B and vice versa. If equal amplitudes/frequencies and equal time slices are used, then maximum equivalence between the A1 and B1 beams will be achieved as a special case. Approximately 80–90% maximum transfer of the incident beam to the selected first order diffracted beam can be expected when only one transducer is being driven.

The wavelength of the laser and frequency of the piezo-transducers must be appropriately matched along with the crystal material. For example, a $CO_2$ laser of 9.25 microns wavelength can be used with a 40 MHz transducer in conjunction with a germanium crystal. As indicated, any material suitable for AOMs can be used for MCAOMs. These include quartz and lithium niobate.

The rate at which a beam can be modulated is related to the risetime of a modulated pulse and is determined by the ratio of the incident beam diameter to the velocity of sound in the crystal. Therefore, a smaller beam size permits a faster risetime and modulation rate. Since the zeroth order beam is inherently the portion of the incident beam not diffracted, it is also possible to control the application of the driving signals to result in modulation of the zeroth order beam if desired. From the earlier discussion it is clear that the zeroth beam can be modulated, but not reduced to zero as long as there is an incident beam. The incident beam can, of course, be controlled independently through the use of shutters, etc.

Figure 3:
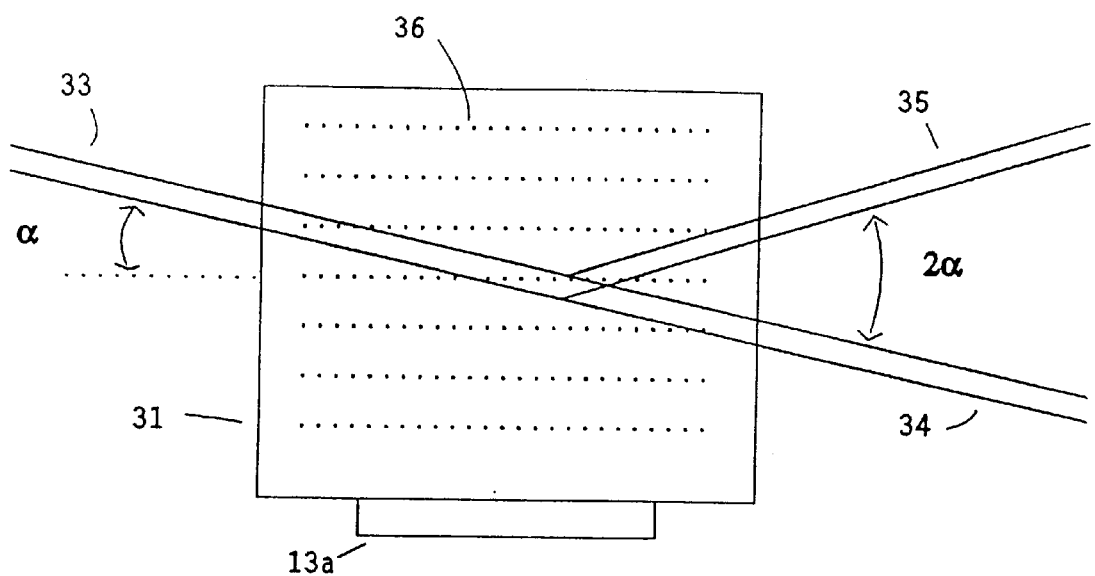
FIG. 3 illustrates a prior art crystal for use in an AOM.

In order to illustrate the angular relationships between the sound fields and the incident beam FIG. 3 which illustrates a prior art AOM will be used. Crystal 31 is typically rectilinear, but the face of the crystal opposite to the transducer 13a may be obliquely angled to dampen acoustic reflections. The incident beam 33 enters the crystal at an angle alpha to intersect the acoustic field (represented by the dotted lines 36) at the angle alpha. The angle of diffraction of the first order beam 35 is then twice alpha.

The required angle alpha for the intersection of the acoustic field and the incident beam is called the Bragg angle which is given by $$\alpha = \frac{1}{2} * \frac{\lambda}{\Lambda}$$

where $\Lambda$ is the acoustic wavelength and $\lambda$ is the optical wavelength. The acoustic wavelength is determined by the ratio of the velocity of sound in the crystal to the frequency:

$$\Lambda = v/f$$

An example of a calculation of a Bragg angle for a $CO_2$ laser $\lambda$=9.2 microns, a germanium crystal and a 40 MHZ transducer is as follows. The velocity of sound of $5.5*10^5$ cm/sec for germanium is available from tables. Thus, $$\Lambda = \frac{5.5*10^5}{40*10^6} = 1.38*10^{-2} \text{ cm}$$

and the Bragg angle alpha is:

$$\alpha = \frac{1}{2} * \frac{9.2*10^{-4} \text{ cm}}{1.38*10^{-2} \text{ cm}} = 33 \text{ milliradians} \cong 2 \text{ degree}$$

Since the diffracted beam typically needs to be physically separated from the zeroth beam by mirrors to be used conveniently, the angle should not be too small. Likewise too large of an angle would also present physical problems for the mirror arrangement. Therefore, it is suggested that the Bragg angle be between 1 and 20 degrees for convenience, although larger and smaller angles are possible.

Figure 4A:
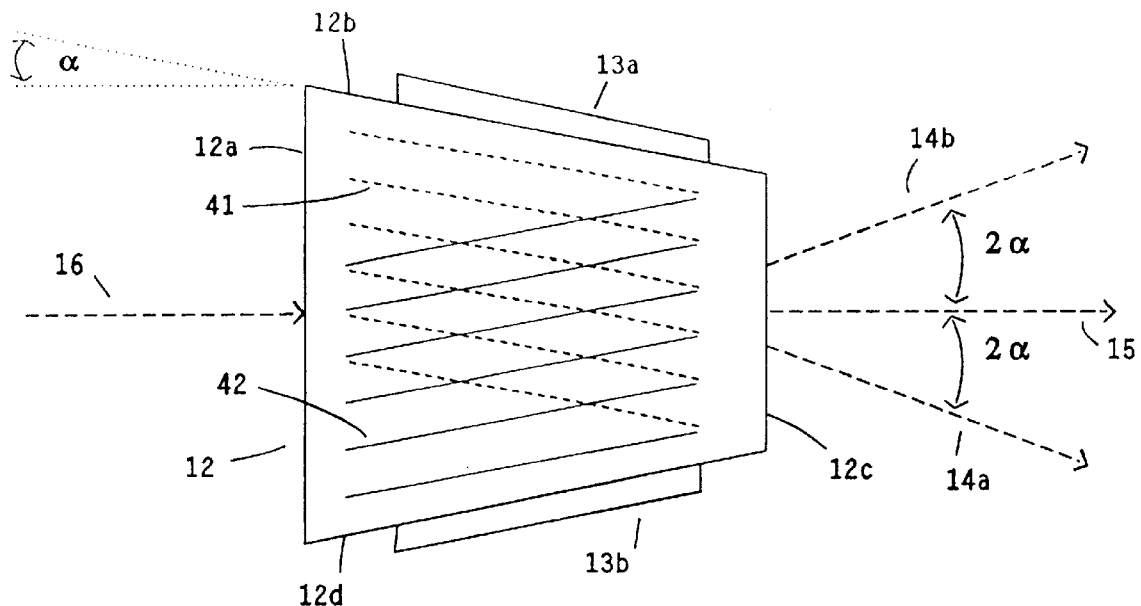
FIGS. 4a–b illustrate a two channel AOM assembly according to the invention.
Figure 4B:
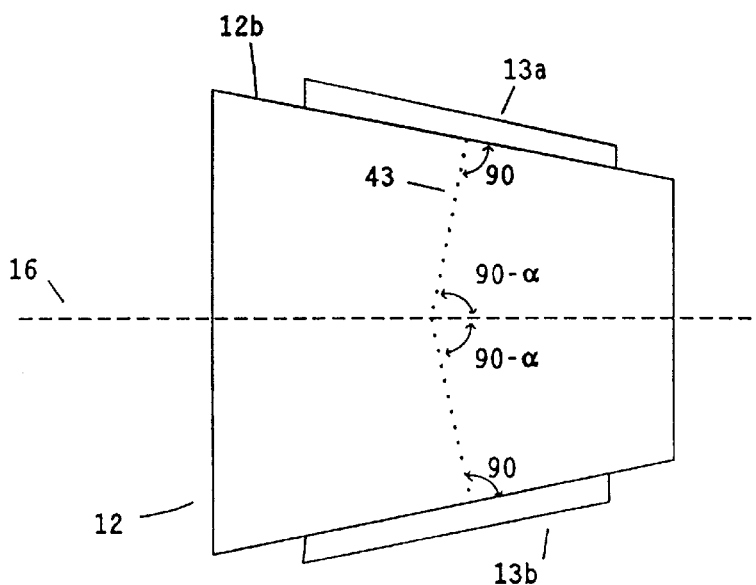

The geometry of a crystal for use in an MCAOM is constrained by the requirement that the angle of intersection between the light and the acoustic field be the same regardless of which transducer is being driven. The faces of the crystal on which the transducers are to be mounted are cut at a specific angle relative to the incident beam axis, i.e., the optical axis, which is typically the central axis of the crystal, but this is not required. FIGS. 4a–b illustrate a DCAOM according to the invention. The angles corresponding to alpha are exaggerated in all of the figures in order to make them readily visible. The view is of a cross section along the optical axis of the x-y plane of the crystal which is trapezoidal. In the other planes (not shown) the cross section shape is not significant. The four sides of the trapezoid are labeled 12a, 12b, 12c and 12d. The incident face 12a is the face through which the incident beam 16 enters the crystal. In FIG. 4a the acoustic field generated by transducer 13a is illustrated by the dashed lines 41 and the acoustic field generated by transducer 13b is illustrated by the lines 42. The acoustic fields 41 and 42 are formed as relatively flat planes parallel to their respective mounting faces. The size of the transducers should be large enough to ensure that the curvature of the sound field is sufficiently small through the beam cross section to be negligible for the application. FIG. 4b shows the required geometry of the mounting faces by showing that a perpendicular line 43 from the mounting face can be projected to intersect the path of the incident beam 16, i.e., the optical axis, at the angle of 90–alpha. This projected perpendicular line simulates the direction of the propagation of the acoustic field from the mounting face. Note that the angle of intersection with the optical axis is maintained when the axis is translated up or down on the y-axis. This will also be true for translation on the z-axis. Therefore, the optical axis need not be through the center of the crystal, so long as the angular relationship are maintained. To simplify the design of the crystal it is convenient to have the incident beam enter perpendicular to the incident face as shown, but this is not actually required as will be seen later. The transducers 13a and 13b are attached to mounting faces 12b and 12d. The mounting faces intersect the incident face 12a at angle of 90–alpha. The exit face 12c is where the beams emerge. The A1-beam 14a and the B1-beam 14b are diffracted at an angle of plus and minus twice alpha. Therefore, the A1 and B1 beams diverge at an angle of four times alpha.

Figure 5A:
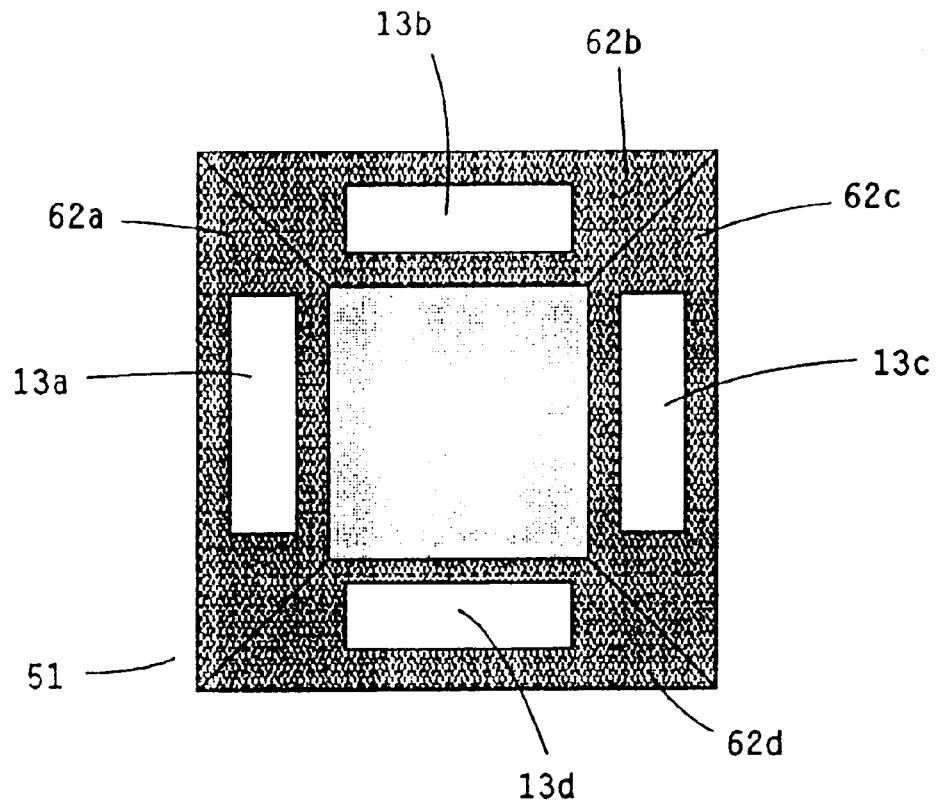
FIGS. 5a–b illustrate a top view and a side view of a four channel AOM assembly according to the invention using a crystal shaped as frustum of a square pyramid.
Figure 5B:
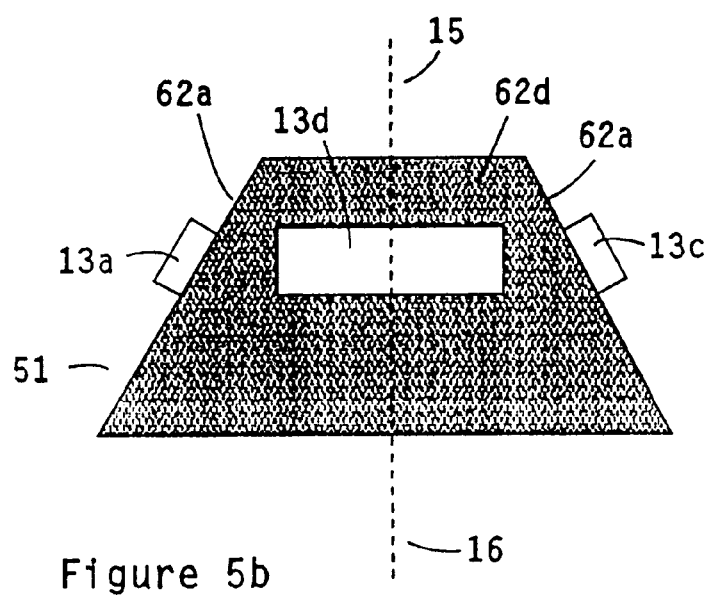

FIG. 5a illustrates a top view of a crystal for use in a four channel AOM according to the invention. The crystal 51 is a frustum of a square pyramid. The four transducers 13a–d are attached to the four mounting faces of the crystal 62a–d which are trapezoidal. The angle of intersection between the trapezoidal faces and the square base and top is a function of the angle alpha similarly to the DCAOM.

Figure 6A:
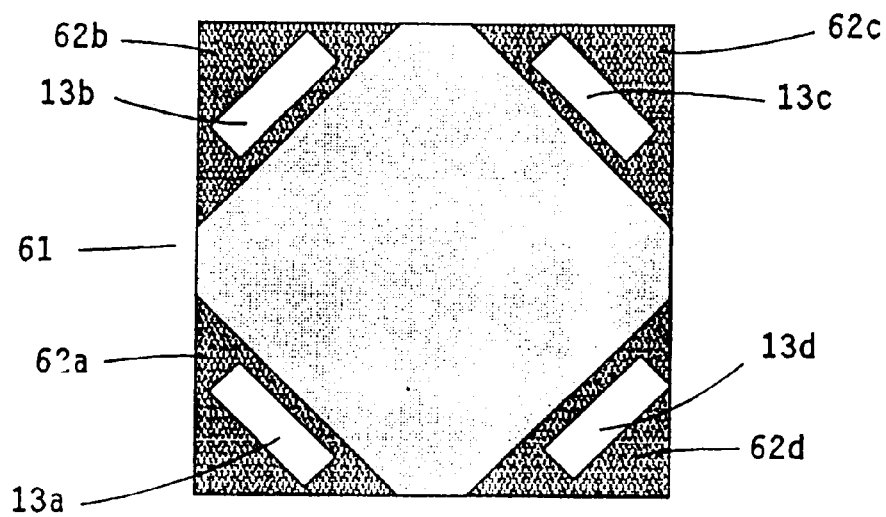
FIGS. 6a–b illustrate a top view and a side view of a four channel AOM assembly according to the invention using a beveled rectilinear crystal.
Figure 6B:
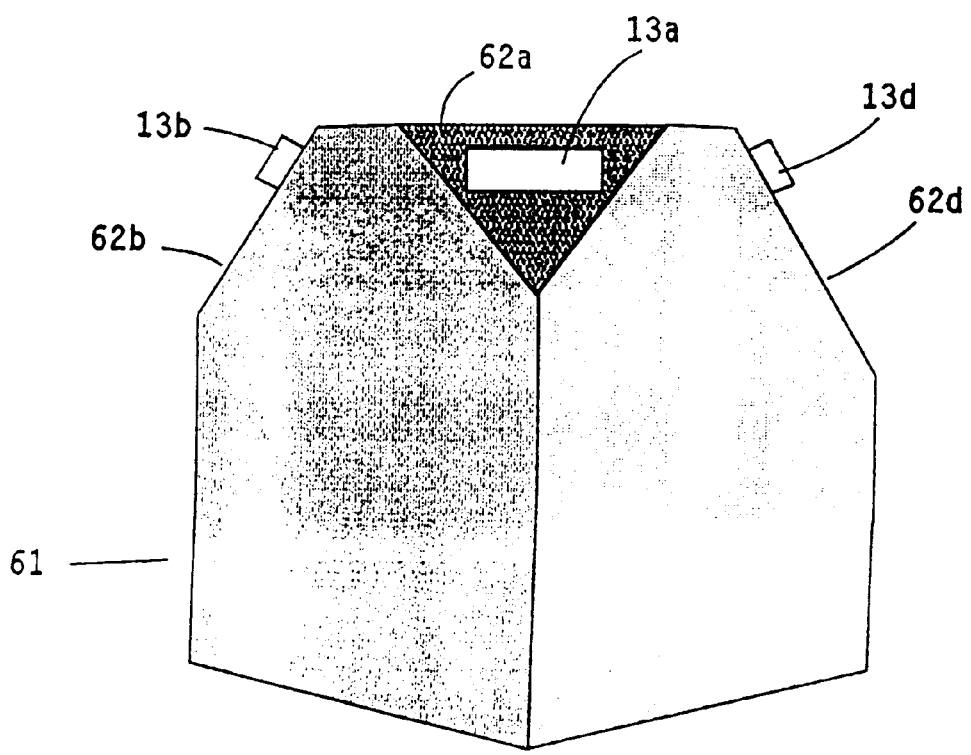
Figure 7A:
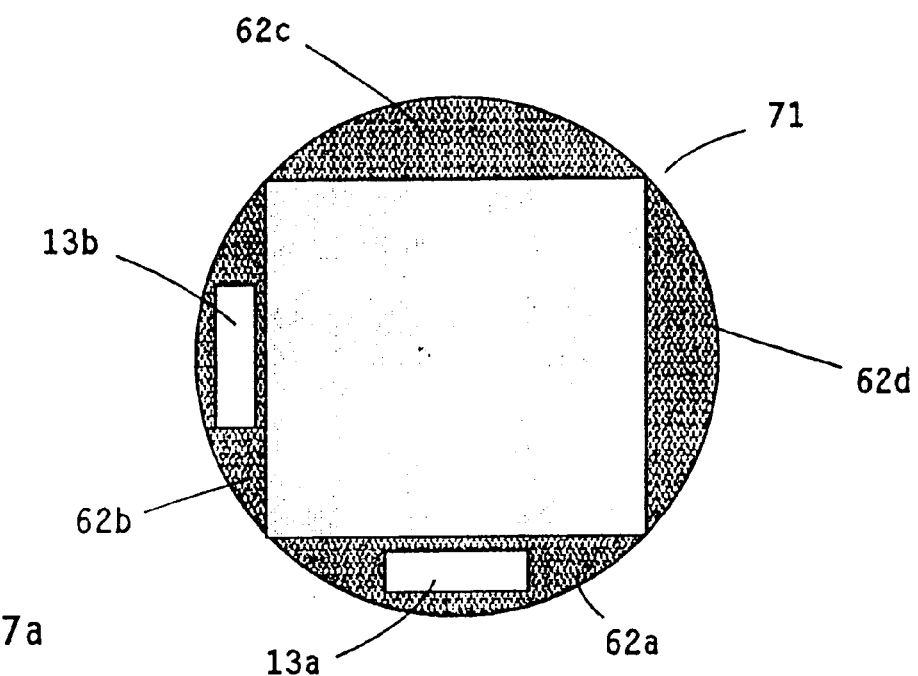
FIGS. 7a–b illustrate a top view and a side view of a two channel AOM assembly according to the invention using a beveled cylindrical crystal.
Figure 7B:
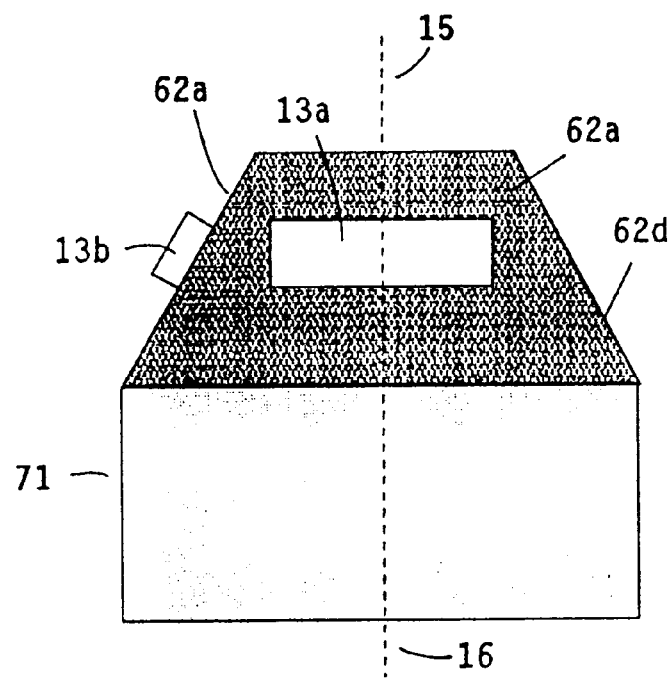

Since the geometric requirements can be met with a frustum of a regular triangular pyramid, a pentagonal pyramid, etc. an MCAOM can be constructed with any number of channels using frusto-pyramidal shapes. Pyramids are also not the only geometric structures for crystals that will work in a MCAOM. For example, the base structure of the crystal can be rectilinear or cylindrical and the faces for the transducers can be cut into the surface or edges to form the mounting faces at the proper angle from the axis. FIG. 6a illustrates a top view of a beveled rectilinear crystal 61 for use in a four channel AOM according to the invention. It can be viewed as essentially a rectilinear crystal with bevels for the mounting faces 62a–d cut into the corners forming triangular mounting surfaces for the transducers 13a–d. When four corners on a square face of the crystal are beveled symmetrically, then acoustic fields generated by transducers on these faces will intersect the incident beam axis at a common angle. FIG. 6b is a perspective side view of the crystal of FIG. 6a. Using the same approach as is illustrated in for a rectilinear crystal, a cylindrical crystal may be used. FIG. 7a is a top view of a faceted cylindrical crystal 71 with mounting faces 62a–d cut into the top. Only two transducers 13a–b are shown on adjacent faces even though there are four mounting faces which can be used. The two transducers may be mounted on opposite faces as well. Likewise three transducers could be used with each one being mounted on any of the three faces. In general, the MCAOM crystals do not have to have a transducer mounted on all of the mounting face for the others to function. Since each transducer functions independently, one or more transducers can be mounted without regard to whether the other faces have transducers. Therefore, for example, it might be convenient to manufacture a standard crystal with a relatively large number of mounting faces, e.g. four, realizing that the crystal would also function as a one, two or three channel device.

Since the requirement is that the mounting faces be cut at a common angle from the axis of the incident beam, the functioning of the crystal is insensitive to other aspects of the shape of the crystal so long as they are not in the optical path and do not induce reflections of the acoustic fields. The MCAOM crystals shown herein inherently avoid significant acoustic reflections because the mounting faces are angled in respect to every other face of the crystal. Whenever a shape for the crystal is selected, the potential problem of acoustic reflections should be considered.

Figure 8:
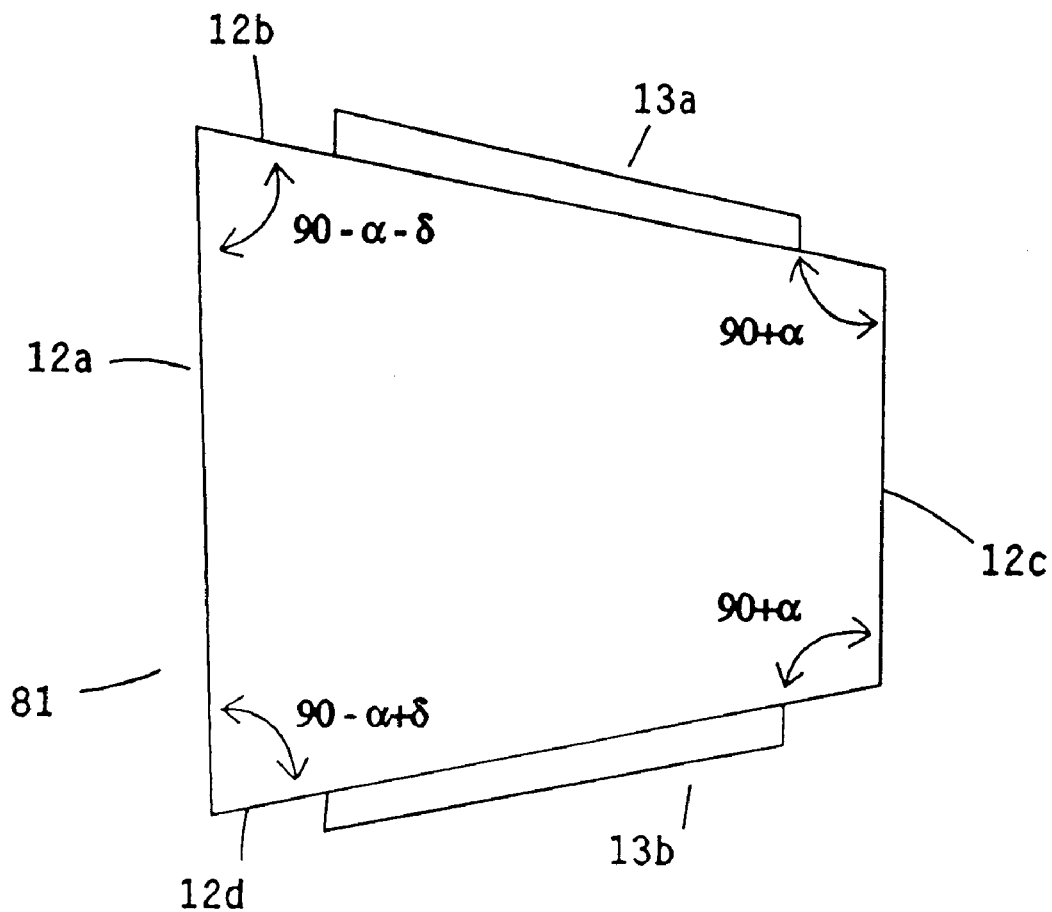
FIG. 8 illustrates a crystal with an antireflection tilt in the incident face for use in a two channel AOM according to the invention.

Since prior art AOM crystals like that shown in FIG. 3 are used with the incident beam striking the crystal at an angle other than 90 degrees, there is no back reflection of the beam from the crystal into the laser cavity. The MCAOMs are conveniently used with the incident beam entering the crystal perpendicularly as has been illustrated and, therefore, back reflection should at least be considered. The inventors have not observed this problem in practice, but if it were a problem in a particular application, one solution would be to introduce an angle to the incident face of the crystal to remove any possibility of back reflection. A DCAOM modified in this manner is illustrated in FIG. 8. Crystal 81 is similar to crystal 12 in FIG. 4 with the exception that the angles between the incident face 12a and the mounting faces 12b and 12d are not equal as they are in crystal 12. If a small tilt angle δ of a few degrees is introduced to the incident face then the angles of intersection with the mounting faces are 90−α−δ and 90−α+δ. The angles of intersection between the mounting faces and face 12c are 90+α and are not affected by the modification and are the same as for crystal 12, i.e., 90+α. FIG. 4 shows tilting in only one plane, but a tilt in any direction will suffice. The tilting of the incident face may introduce sufficient refraction of the incident beam to require that the angle of the incident beam be adjusted to compensate for effect.

Since the Bragg angle is a function of the acoustic wavelength, it is sometimes useful to modulate the Bragg angle by modulating the frequency of the driving signal for the transducer. This frequency modulation can be used to sweep the diffracted beam position linearly through a range of angles. Similarly the multiple beams of an MCAOMs can be used with frequency modulated driving signals to sweep the beams. For example, if the DCAOM shown in FIGS. 6a–b were driven with frequency modulated signals the four first order beams would sweep to form an x-y axis. Transducers 13b and 13d on opposite sides would produce tandem beams while the beams for the other pair of transducers 13a, 13c would be at right angles.

Figure 9:
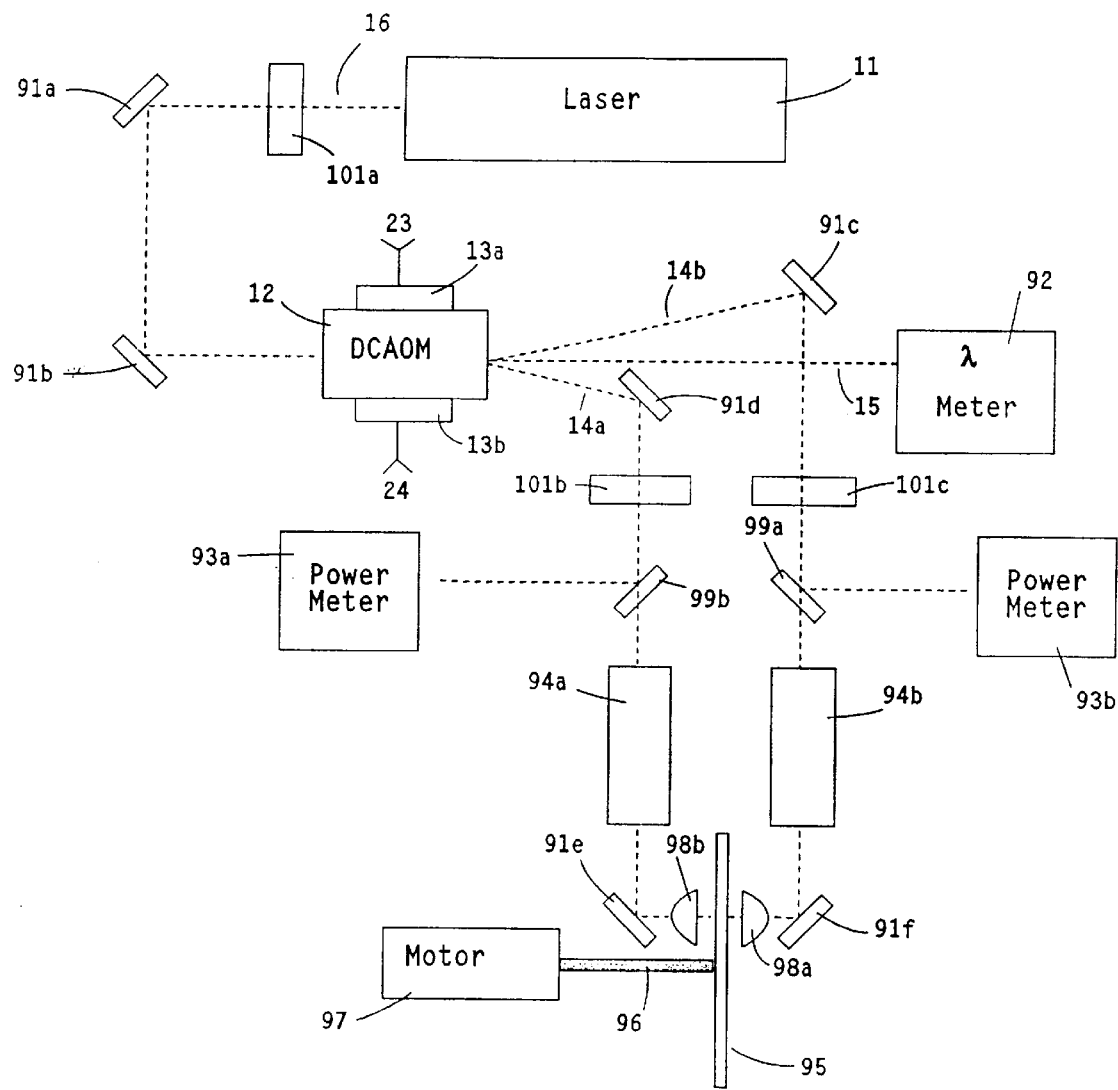
FIG. 9 illustrates an application of a DCAOM in a disk texturing apparatus.

FIG. 9 illustrates a particular application of a DCAOM in laser system for texturing disk substrates for use as magnetic disks in disk drives. It is well known to use a laser to temporarily soften small spots of the surface of a substrate to form a circular or spiral pattern of bumps on the substrate which can be used as a contact start-stop area for the sliders. Since it is important to produce uniform and equivalent texture on both sides of a substrate, it is desirable to use identical pulsed laser beams on each side. The system illustrated in FIG. 9 uses a DCAOM to form two essentially identical pulsed laser beams. Laser 11 generates a beam which is routed through shutter 101a. Steering mirrors 91a, 91b direct the beam to the DCAOM 12 which has transducers 13a, 13b driven by signals 23, 24 which in this application are alternately pulsed to generate pulsed A1 and B1 beams 14a, 14b. The driving signals 23, 24 are selected to generate the maximum amplitude in beams 14a and 14b which as indicated should be about 80–90% of the incident beam. The zeroth order beam 15 is allowed to strike a wavelength meter 92. The A1 and B1 beams are routed to opposite sides of the disk being textured 95 through steering mirrors 91c, 91d, 91e, 91f, through beam expanders 94a, 94b and through focusing lenses 98a, 98b. A small portion of each beam is reflected by beam splitters 99a, 99b to power meters 93a, 93b. The disk is rotated by spindle 96 attached to motor 97 while the beams are pulsed to allow the beams to texture a circular or spiral pattern on each side of the disk. The motor, spindle and disk should be mounted on a translation stage (not shown) to allow a band of texture to be formed on the disk.

Figure 10:
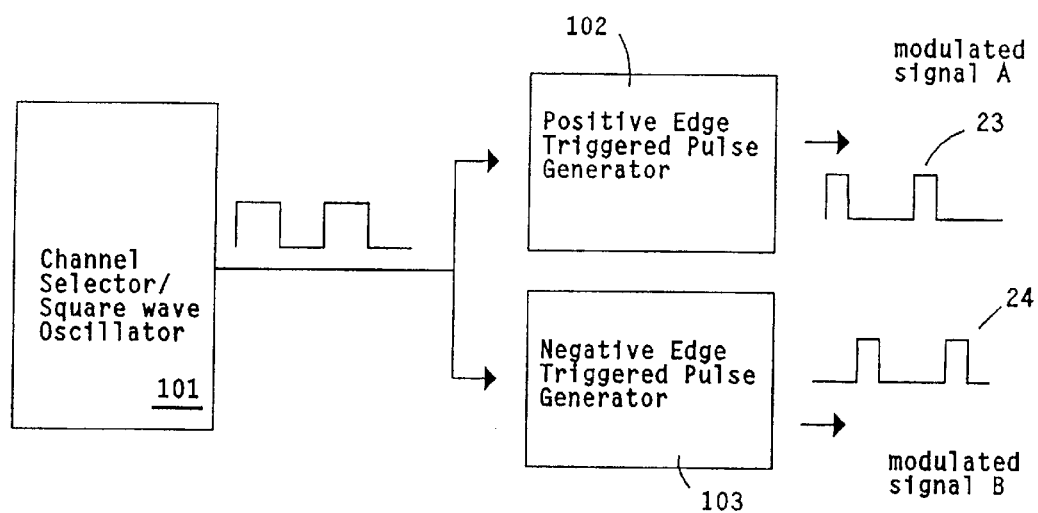
FIG. 10 illustrates one possible control means for the driving signals for the transducers of a DCAOM.

FIG. 10 illustrates one possible control means for the driving signals for the transducers of a DCAOM which can be used with the system illustrated in FIG. 9. The embodiment described uses a master 20 kHz square-wave oscillator 101 of 50—50 duty cycle to drive positive and negative edge triggered pulse generators 102, 103 which drive gatable RF generators 104a, 104b to form the envelopes of the modulated signals 23, 24. The oscillator 101 serves the function of the channel selector. Beams A1 and B1 are controlled by the two pulse trains thus generated from the rising and falling edges of the oscillator. Preferably the pulse widths are less than half of the master oscillator's period so that there is no overlap. Assuming a 20 kHz rep rate for the oscillator, this means that the pulse width for texturing the substrate typically is less than ten microseconds. Both the amplitude and the width of the pulses are used to control the intensity and pulse length of the first order laser beams.

What is claimed is:
1. An acousto-optic modulation assembly comprising:
    a) a crystal which is transparent along an axis for light of a selected wavelength, the crystal having at least first and second mounting faces which are oriented symmetrically to the axis; and
    b) at least two transducers, for producing acoustic waves from electrical signals, attached to the two mounting faces, the transducers being oriented so that the acoustic waves from the first and second transducers will intersect the axis at an acute common angle.
2. The acousto-optic modulation assembly of claim 1 wherein the crystal has a cross section along the axis which is trapezoidal in shape and the acute angle is from 1 to 20 degrees.
3. The acousto-optic modulation assembly of claim 1 wherein the crystal is a frustum.
4. The acousto-optic modulation assembly of claim 1 wherein the crystal has a cylindrical portion.
5. The acousto-optic modulation assembly of claim 1 wherein the crystal is generally rectilinear with the mounting surfaces being beveled corners.
6. The acousto-optic modulation assembly of claim 1 wherein the acoustic waves from the transducers intersect in the crystal at an angle which is twice the acute common angle.
7. The acousto-optic modulation assembly of claim 1 wherein a cross section of the crystal along the axis through the crystal is a trapezoid having a front, back and two sides with the sides containing the first and second mounting faces and the acute angle is from 1 to 20 degrees.
8. The acousto-optic modulation assembly of claim 1 further comprising:
    c) a third mounting face on the crystal oriented symmetrically to the axis with respect to the first and second mounting faces; and
    d) a third transducer, for producing acoustic waves from electrical signals, attached to the third mounting face, the third transducer being oriented so that the acoustic waves from the third transducer will intersect the axis at the acute common angle.
9. The acousto-optic modulation assembly of claim 8 further comprising:
    e) a fourth mounting face on the crystal oriented symmetrically to the axis with respect to the first, second and third mounting faces; and
    f) fourth transducer, for producing acoustic waves from electrical signals, attached to the fourth mounting face, the fourth transducer being oriented so that the acoustic waves from the fourth transducer will intersect the axis at the acute common angle.
10. A crystal for use in an acousto-optic modulator comprising:
    a planar incident face;
    a planar exit face disposed opposite the incident face so that a laser beam entering the incident face at a selected angle will travel along an optical axis to exit through the exit face;
    at least first, second and third planar mounting faces for mounting first, second and third acoustic transducers, the mounting faces being oriented so that a first line perpendicular to the first mounting face can be projected to intersect the optical axis at an angle alpha and a second line perpendicular to the second mounting face can be projected to intersect the optical axis at the angle alpha, a third line perpendicular to the third mounting face can be projected to intersect the optical axis at the angle alpha and the first and second lines intersect at an angle twice alpha.

11. The crystal of claim 10 wherein the first and second planar mounting faces are oriented at an angle with respect to the axis of from 1 to 20 degrees.

12. The crystal of claim 10 further comprising a fourth planar mounting face for mounting a fourth acoustic transducer, the fourth mounting face being oriented so that a line perpendicular to the fourth mounting face can be projected to intersect the optical axis at the angle alpha.

13. The crystal of claim 10 wherein the crystal has a cross section along the optical axis which is trapezoidal in shape.

14. The crystal of claim 10 wherein the crystal is a frustum.

15. The crystal of claim 10 wherein the crystal is generally cylindrical with the mounting faces being beveled portions of an edge.

16. The crystal of claim 10 wherein the crystal is generally rectilinear with the mounting surfaces being beveled corners.

17. A laser system comprising:
a crystal which is transparent along an axis for light of a selected wavelength;
a laser for producing an incident beam of light of the selected wavelength upon the crystal;
at least first and second acoustic transducers attached to first and second mounting faces on the crystal and oriented symmetrically to the axis so that acoustic fields for each of the transducers intersect the incident beam at a common angle inside the crystal; and
first driver means for producing a drive signal for the first transducer to form a first acoustic field in the crystal causing a portion of the incident beam to diffract to form a first order beam A1; and
second driver means for producing a drive signal for the second transducer to form a second acoustic field in the crystal causing a portion of the incident beam to diffract to form a first order beam B1.

18. The laser system of claim 17 further comprising means for modulating an amplitude or frequency of first and second drive signals to modulate beams A1 and B1.

19. The laser system of claim 17 further comprising means for selectively driving first and second transducers to form beams A1 or B1 to chop the incident beam so that when beam A1 is formed it has more than 50% of the energy of the incident beam and when beam B1 is formed it has more than 50% of the energy of the incident beam.

20. The laser system of claim 19 wherein the means for selectively driving first and second transducers allocates equal time slices to A1 and B1 beams and drives the transducers with equal amplitude signals to cause the A1 and B1 beams to be essentially equivalent.

21. The laser system of claim 17 wherein the first driver means modulates a frequency of the first acoustic field to vary an angle of diffraction of the A1 beam causing the A1 beam to sweep between first and second positions.

22. The laser system of claim 17 further comprising a third acoustic transducer attached to the crystal and oriented so that an acoustic field for the third transducer intersects the incident beam at the common angle.

23. A method of operating a laser system comprising the steps of:
generating a laser beam incident on a crystal generally along a central axis of the crystal;
applying a first drive signal to a first acoustic transducer mounted on a first face of the crystal to form a first acoustic field in the crystal which intersects the laser beam at a Bragg angle which causes a portion of the laser beam to diffract into first order beam A1, and
applying a second drive signal to a second acoustic transducer mounted on a second face of the crystal to form a second acoustic field in the crystal which intersects the laser beam at the Bragg angle and symmetrically with respect to the first acoustic field which causes a portion of the laser beam to diffract into first order beam B1.

24. The method of claim 23 further comprising the step of modulating an amplitude of the first drive signal to modulate an amplitude of beam A1.

25. The method of claim 23 further comprising the step of modulating a frequency of the first drive signal to modulate an angle of diffraction of beam A1.

26. The method of claim 23 further comprising the step of alternately driving first and second transducers with equal amplitude signals to form equal intensity pulses of beams A1 and B1.

* * * * *